United States Patent
Burghard et al.

(10) Patent No.: US 8,336,053 B2
(45) Date of Patent: *Dec. 18, 2012

(54) TRANSACTION MANAGEMENT (75) Inventors: Stephen J. Burghard, Hants (GB); Ian J. Mitchell, Hants (GB); Andrew Wright, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 1082 days.

This patent is subject to a terminal disclaimer.

(21) Appl. No.: 12/252,082

(22) Filed: Oct. 15, 2008

(65) Prior Publication Data

US 2009/0100434 A1    Apr. 16, 2009

(30) Foreign Application Priority Data

Oct. 15, 2007   (EP) .................................... 07118450

(51) Int. Cl.
G06F 9/48        (2006.01)

(52) U.S. Cl. ........................................ 718/103; 718/102

(58) Field of Classification Search .................... None
See application file for complete search history.

(56) References Cited

U.S. PATENT DOCUMENTS

| | | | | |
|---|---|---|---|---|
| 5,857,204 | A  * | 1/1999 | Lordi et al. ........................... | 1/1 |
| 5,956,489 | A  * | 9/1999 | San Andres et al. .......... | 709/221 |
| 6,889,214 | B1 * | 5/2005 | Pagel et al. .................... | 705/410 |
| 7,032,019 | B1 * | 4/2006 | Noguchi et al. ............... | 709/224 |
| 7,783,750 | B1 * | 8/2010 | Casey et al. .................... | 709/224 |
| 2002/0198984 | A1 * | 12/2002 | Goldstein et al. ............. | 709/224 |
| 2003/0115429 | A1 * | 6/2003 | Olstad et al. .................. | 711/158 |
| 2003/0115469 | A1 * | 6/2003 | Shippy et al. .................. | 713/178 |
| 2003/0135609 | A1 * | 7/2003 | Carlson et al. ................ | 709/224 |
| 2006/0294589 | A1 * | 12/2006 | Achanta et al. ................. | 726/24 |

* cited by examiner

*Primary Examiner* — Eric Coleman (74) *Attorney, Agent, or Firm* — Steven M. Greenberg, Esq.; Carey, Rodriguez, Greenberg & O'Keefe (57) ABSTRACT

A method and transaction processing system for managing transaction processing tasks are provided. The transaction processing system comprises a transaction log, a log management policy, a log manager and a dispatcher. The method comprises maintaining a transaction log of recoverable changes made by transaction processing tasks and storing a log management policy including at least one log threshold. Usage of the log by transaction processing tasks is then monitored to determine when a log threshold is reached. When a log threshold is reached the active task having the oldest log entry of all active tasks is identified and its dispatching priority is increased. This increases the likelihood that the identified task will be dispatched, and should mean that the task will more quickly reach normal completion.

12 Claims, 5 Drawing Sheets

TRANSACTION MANAGEMENT

CROSS-REFERENCE TO RELATED APPLICATIONS

This application claims priority under 35 U.S.C. §119(a) to European Patent Application Serial Number EP07118450.1 filed Oct. 15, 2007, the entirety of which is incorporated herein by reference.

FIELD OF THE INVENTION

The present invention relates to the field of transaction processing and in particular to a system and method for managing transactions.

BACKGROUND OF THE INVENTION

Transactions are familiar to us in everyday life when we exchange money for goods and services, such as buying a train ticket or paying for medicine. Such transactions involve a short conversation (for example, requesting availability and cost), and then making the payment. The processing of any one of these items is a business transaction of the kind that is handled by a transaction management system.

A transaction in the business sense can be viewed as an activity that must be completed in its entirety with a mutually agreed-upon outcome. It usually involves operations on some shared resources and results in overall change of state affecting some or all of those resources. When an activity or a transaction has been started and the mutually agreed outcome cannot be achieved, all parties involved in a transaction should revert to the state they were in before its initiation. In other words, all operations should be undone as if they had never taken place.

There are many examples of business transactions. A common one involves transfer of money between bank accounts. In this scenario, a business transaction would be a two-step process involving subtraction (debit) from one account and addition (credit) to another account. Both operations are part of the same transaction and both must succeed in order to complete the transaction. If one of these operations fails, the account balances must be restored to their original states.

Typically such transactions consist of many computing and data access tasks to be executed in one or more machines; the tasks may include handling the user interface, data retrieval and modification, and communications. In the example above, the money transfer operation is a transaction composed of debiting one account and crediting another.

In the context of business software, we can express the above more precisely. A transaction (sometimes also referred to as a 'Unit-Of-Work' or 'UOW') is a set of related operations that must be completed together. All their recoverable actions must either complete successfully or not at all. This property of a transaction is referred to as 'atomicity'.

In the simplest case, a transaction will access resources connected to a single computer processor. Such a transaction is referred to as a 'local transaction'. More often, however, a transaction will access resources which are located in several different computer processors, or logical partitions, each maintaining its own transaction log. Such a transaction is referred to as a 'distributed transaction'.

When a distributed transaction ends, the atomicity property of transactions requires that either all of the processors involved commit the transaction or all of them abort the transaction. To achieve this one of the processors takes on the role of coordinator to ensure the same outcome at all of the parties to the transaction, using a 'coordination protocol' that is commonly understood and followed by all the parties involved. The two-phase commit protocol has been widely adopted as the protocol of choice in the distributed transaction management environment. This protocol guarantees that the work is either successfully completed by all its participants or not performed at all, with any data modifications being either committed together (completed) or rolled back (backed out) together on failure.

Another property of a transaction is its durability. This means that once a user has been notified of success, a transaction's outcome must persist, and not be undone, even when there is a system failure. A recovery manager is used to ensure that a system's objects are durable and that the effects of transactions are atomic even when the system crashes. The recovery manager saves information required for recovery purposes. This recovery can be for the dynamic backout of a transaction, perhaps as a result of a failure after a task updated a recoverable temporary storage queue. Additionally the recovery data can be used for restoring a transaction processing system to a committed state, for example when the system is restarted after system failure. Typically, the recovery file comprises at least one log containing the history of the transactions performed by a transaction processing system. In the event of a system failure, the recovery file can be played back to return the system to its state right before the failure, and the transaction log(s) used to check for and undo transactions that were not properly completed before failure.

Also, in the event of a transaction failure, the transaction log can be used to reverse updates that have been carried out by that transaction, by working backwards from the last change before the failure, hence the name 'dynamic transaction backout'. The backout occurs before any locks on any affected resources are released, which safeguards other tasks from the possibility of using corrupted data, because modified data is not released for use by them ("committed") until the current task has finished with it. In case the log needs to be replayed later in a system restart, an entry is first made in the log to indicate that that transaction is being backed out.

Examples of systems which carry out such transaction logging include transaction systems such as IBM® CICS® Transaction Server or IBM WebSphere® Application Server, as well as database systems such as IBM DB2® or IBM IMS™ (IBM, CICS, WebSphere, DB2 and IMS are trade marks of International Business Machines Corporation).

The scheduling and dispatching of transaction processing tasks is usually handled by a dispatcher, which controls the order in which tasks are handled by allocating processor time among them, based on a dispatching priority value associated with each task. The log typically records the information in the order that the activity occurs. Without some management, this would consume an ever increasing amount of resource. So it must be reorganised on a regular basis so as to reduce its size by the recovery manager carrying out a process called 'keypointing'. Keypointing comprises writing current committed values of a system's objects to a new portion of the recovery file, together with transaction status entries and intentions lists for transactions that have not been fully resolved. An intentions list for a transaction contains a list of the references and the values of all the objects/resources that are altered by that transaction, as well as information related to the two-phase commit protocol. Once a keypoint has been taken, i.e. information stored through a keypointing procedure, recovery information for irrevocably committed (or backed out) transactions can usually be discarded from the log, sometimes called 'trimming' the log. This reduces the file size of the log as well as the number of transactions to be dealt with during recovery.

The rate that old log records are deleted by trimming should ideally match the rate at which new log data is being generated as new work enters the transaction system and makes its own recoverable changes to resources. In a well tuned on-line transaction processing (OLTP) environment, the volume of log data held on the log should remain reasonably constant over time, with an underlying periodic rise and fall in the number of log records held on the log as both the new work and the housekeeping work are performed.

This mechanism of log data deletion usually solves the problem of logs continually growing in size over time. However, a long-running UOW can prevent this mechanism from working, as until such a UOW has completed, and its log data is no longer required, its data cannot be deleted from the log and all data logged since the first log entry of that UOW must be maintained on the log. Hence, the system will not be able to trim the log after keypointing, and the log will grow and grow in size. A long-running unit of work (UOW) of this type may be a valid UOW that has performed a large number of recoverable changes, and so generated a large volume of log data. Alternatively, it may be for a so-called 'rogue' program that has entered an invalid loop while performing continual recoverable changes, thereby generating an excessive number of log records, or which is hanging in an uncommitted state.

Eventually, when a critical threshold of the logging subsystem, the operating system, or the available hardware is exceeded, a request to write to the log will fail for an "out of space" type of condition. When such an error is returned to the transaction system, it typically results in a serious failure. The system can no longer log any recoverable changes and so protect them from failures that require them to be backed out. Recovery processing (and hence data integrity) can no longer be guaranteed.

Current mechanisms intended to prevent such a scenario include the emission of human-readable messages when a certain number of keypoints have been taken without the system having been able to trim the log. Such messages typically indicate the UOW which is preventing the log from being trimmed. In response to such a message, or to a series of such messages, a system operator may choose to take manual action to terminate that 'rogue' UOW.

The present invention seeks to address the above problems and provide an improved mechanism which may reduce the likelihood of encountering a log-full condition.

SUMMARY OF THE INVENTION

A first aspect of the invention provides a method for managing tasks in a transaction processing system. The method comprises maintaining a transaction log of recoverable changes made by transaction processing tasks and storing a log management policy including at least one log threshold. Usage of the log by transaction processing tasks is then monitored to determine when a log threshold is reached. When a log threshold is reached the active task having the oldest log entry of all active tasks is identified and its dispatching priority is increased.

The intention of this method is to increase the likelihood that the identified task will be dispatched. The expectation is that, having increased its dispatching priority, the task will more quickly reach normal completion (the assumption being that it has been starved of CPU).

A second aspect of the invention provides a transaction processing system comprising a transaction log, a log management policy, a log manager and a dispatcher. The transaction log contains log records identifying recoverable changes made by transaction processing tasks. The log management policy identifies a policy for managing the log, including at least one log threshold. The log manager monitors usage of the transaction log by transaction processing tasks and determines when a log threshold is reached. When a log threshold is reached the active task having the oldest log entry of all active tasks is identified and the dispatcher increases the dispatching priority of the identified task.

User-provided thresholds for specific transactions, or for the system as a whole, can enable the system to respond to a growing log size by dynamically altering the running of the UOWs within the system.

BRIEF DESCRIPTION OF THE DRAWINGS

Preferred embodiments of the present invention will now be described by way of example only, with reference to the accompanying drawings in which.

DESCRIPTION OF PARTICULAR EMBODIMENTS

Figure 1:
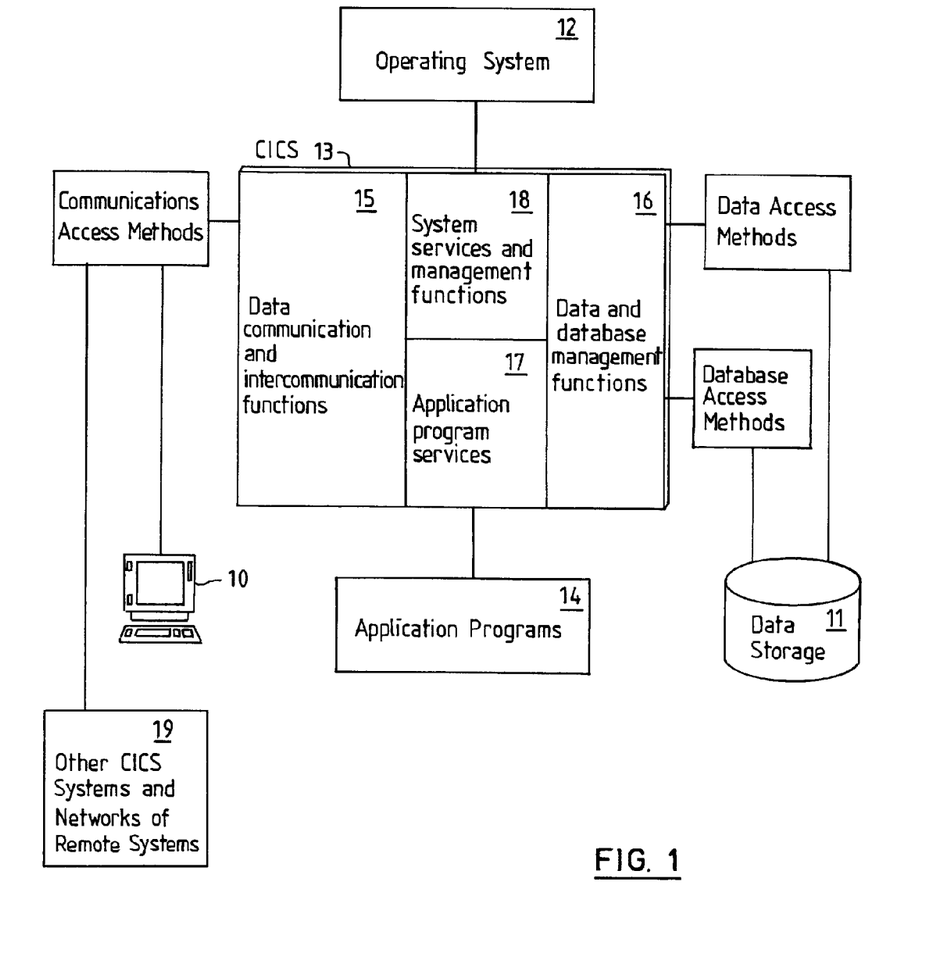
FIG. 1 shows an overview of a transaction processing system suitable for the implementation of a method according to the invention.

One preferred embodiment of the invention is implemented in relation to IBM's general purpose online transaction processing (OLTP) software, CICS®. FIG. 1 shows a CICS transaction processing system including associated hardware and software. The hardware includes terminals such as 10 and databases and files such as 11. A host computer operating system 12, such as MVS®, or z/OS®, supplies general data processing services to CICS software 13. The CICS software may be regarded as a subsidiary operating system, or application server, which provides specialized online services to provide an environment for execution of online application programs 14, typically written by a customer for a specific online transaction processing application. (MVS and z/OS are registered trade marks of International Business Machines Corporation).

Application programs give users online access to their data and the ability to send messages to other CICS users. In addition, application programs running under CICS can communicate with other programs running elsewhere in the same computer system, or with other computing systems 19.

The CICS software 13 includes data communication functions 15 which provide an interface between CICS and local or remote terminals to make the input or output of data easier. They provide a degree of device independence and format independence for application programs. There are also multi-region operation (MRO) and intersystem communication (ISC) facilities.

CICS has interfaces to database products and to standard file access methods. CICS also has routines to handle queues and scratchpad data used within itself. Application program services 17 provide an interface between CICS and the application programs 14. System services 18 provide an interface between CICS and the operating system. They include functions to control CICS and to share resources. Data handling functions 16 provide an interface between CICS and stored data 11. They allow the data to be read or updated, while preventing unauthorised access. Moreover, these functions ensure the preservation of data and system integrity, both in normal operation and under error conditions. In particular, these functions include recovery mechanisms and transaction logging.

In CICS, the scope of recoverable changes made by an application is known as a Unit of Work (UOW). This is the concept of a "transaction" in the general transaction processing sense, that is an inseparable set of recoverable changes which must all be performed, or else must all be backed out. This meaning of "transaction" is not the same as the one used within CICS; a CICS Transaction is an application comprising a predefined sequence of data processing that corresponds to a particular business transaction, such as the withdrawal of cash from an account via an ATM machine, for example. The sequence involves the execution of any number of CICS application programs that together carry out the application's role. These CICS application programs can contain one or more UOWs.

A CICS task is a particular instance of the performance of a CICS Transaction. Two ATM operators may start the same Transaction simultaneously, from different terminals (such as two different ATM machines, for example); each is setting the CICS system a separate task and will be given separate treatment.

Figure 2:
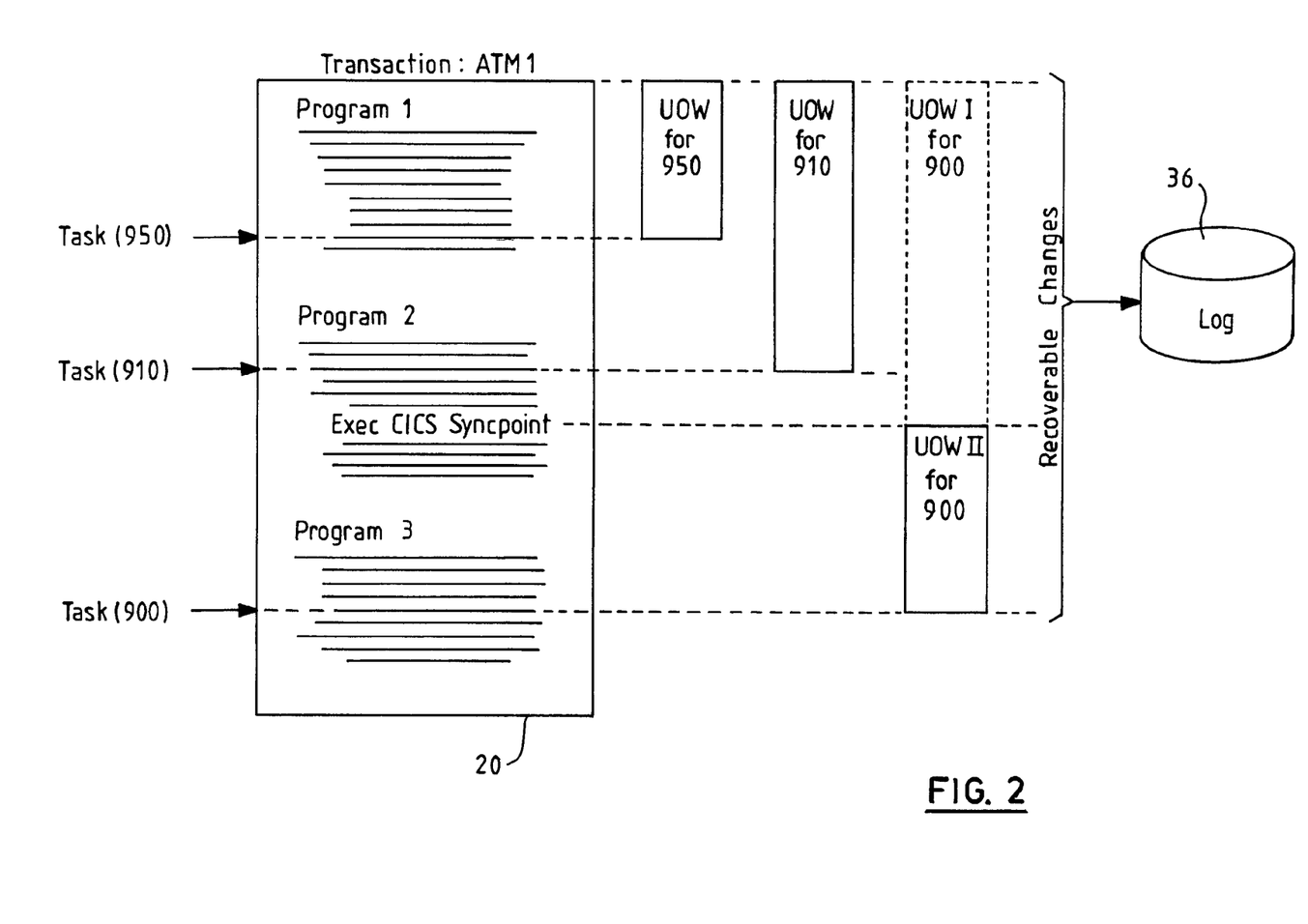
FIG. 2 illustrates the CICS concepts of transactions, tasks and UOWs.

FIG. 2 illustrates this concept. It shows a CICS Transaction 20 called 'ATM1', which comprises a sequence of three CICS application programs, Program 1, Program 2 and Program 3. Three tasks 950, 910 and 900 have each started for this Transaction and each is independently threading its way through the code for these three programs. As shown by the arrows on the left of the Transaction 20, each of these tasks is at a different stage of execution. To the right of the Transaction, the UOWs for each of these three tasks are shown. Task 900 has executed a first UOW I, which is no longer 'in-flight', (and thus shown in dashed line rather than solid line), having been committed by means of a syncpoint (here, an EXEC CICS SYNCPOINT command), which occurs in Program 2. It is currently executing a second UOW as part of the same Transaction. Recoverable changes for all the UOWs are stored in the log 36.

Figure 3:
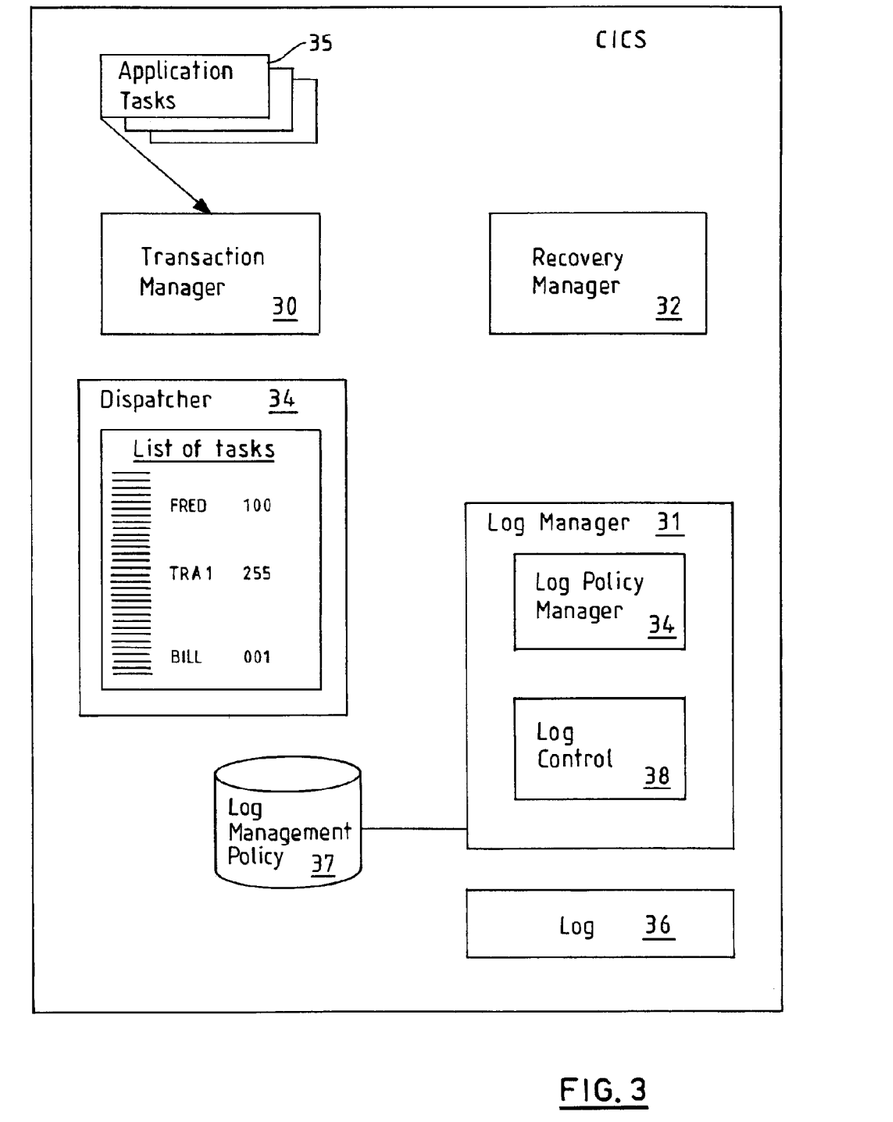
FIG. 3 shows the components for implementing the invention according to a preferred embodiment.

The system of the preferred embodiment comprises a log manager 31, transaction manager 30, log 36, log management policy 37, recovery manager 32, and dispatcher 34, as shown in FIG. 3. The CICS Recovery Manager 32 coordinates UOW and CICS system recovery. The Recovery Manager invokes the Log Manager to store and retrieve log data for commit and backout purposes. The transaction log 36 used to support system recovery and dynamic transaction backout is called the CICS System Log. This is used to store log records required to provide dynamic transaction backout of a failing Unit-Of-Work (UOW); for example, when a task abends having written to a recoverable Virtual Storage Access Method (VSAM) file. In addition, the CICS System Log is used for recovering an entire CICS system to a committed state when performing an emergency restart.

Figure 5:
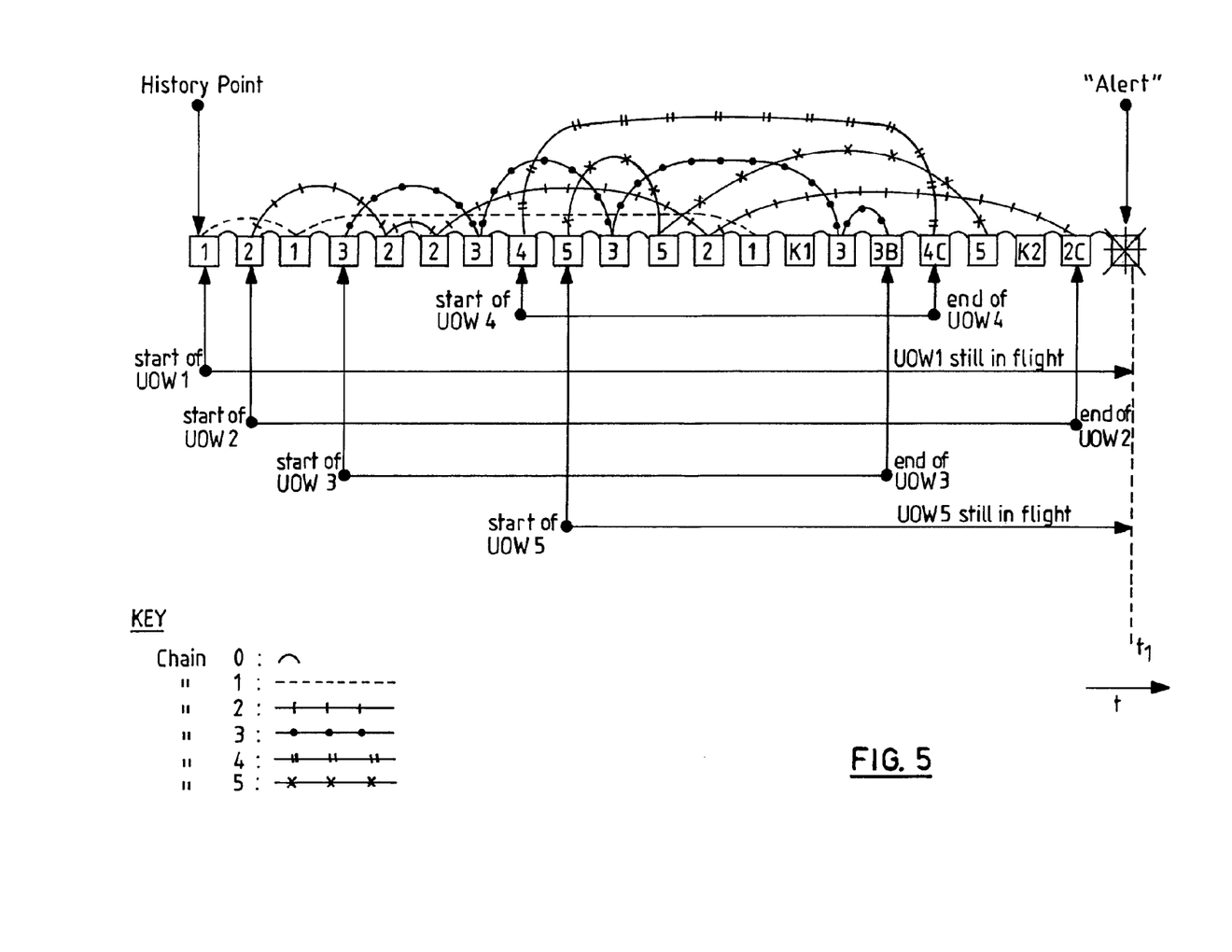
FIG. 5 shows a simple example log stream for explanation purposes.

The CICS System Log records "before-images" of changes to resources managed under CICS. Each log record is associated with a particular UOW and has an ID number called the 'blockid', which orders the log records in a sequential manner. Additionally, a log record may have a pointer to the blockid of the previous log record associated with the same UOW. Thus the log records are said to be linked together in 'chains' associated with particular UOWs, as well as in chronological order, as shown in FIG. 5. In this simplified example of a log stream, at time $t_1$ UOWs 1, 2, 3, 4, and 5 have each written to the log. Chain 0 represents a sequential chain from each log record back to the preceding record. Chains 1 to 5 link together log records associated with UOWs 1 to 5 respectively. UOWs 2, 3 and 4 have committed or backed out (as indicated by records 2C, 3B and 4C). Also shown on the log are two keypoint records K1 and K2. At the time of the first keypoint, K1, the log was trimmed up to the beginning of UOW 1 as shown in the Figure. At the time of the second keypoint, K2, no trimming of the log was able to take place as UOW 1 was still inflight.

The log manager 31 comprises a log control 38, which monitors write requests to the log, and maintains a count of bytes to the log and to each individual chain, as well as the blockid of the oldest record in each chain; and a log policy manager 39, which monitors the current usage of the log and compares this to the system's log management policy 37.

As has been mentioned earlier, tasks within CICS can issue syncpoints to mark their work as consistent and ready to be committed. Part of syncpoint processing involves the logical deletion of the log data for the task's UOW. This data is still held on the System Log however, and needs to be deleted by a call to the Log Manager, which CICS issues periodically as part of activity keypoint processing. At the time of an activity keypoint, the CICS Log Manager trims the tail of the System Log by determining the position, called the 'trim point' or 'history point', of the oldest log data still required for any UOW of interest to CICS, and deleting System Log data created before this point.

At any time there are likely to be hundreds of CICS tasks to be performed 'concurrently', all requiring use of the same resources. The scheduling and dispatching of transaction processing tasks 35 is handled by the CICS dispatcher 34, which controls the rate and order in which tasks are handled by allocating processor time among them, and the transaction manager 30, which handles task control and manages the status of all CICS tasks. The dispatcher usually assigns a dispatching priority to a task based on a dispatching priority value given in a transaction definition and set by the system programmer.

The dispatcher works by monitoring the many tasks that are open in CICS. Because transactions are not normally processed through to completion in a single uninterrupted operation, the dispatcher makes decisions many times during the execution of a task. For example, a transaction might be processed until it reaches an instruction involving input from a file or terminal. Then, while the transaction waits for its input, the dispatcher selects another waiting task to begin or resume execution. At any one time only one task is allocated control of the processor. The dispatcher selects the highest priority task that is ready to be processed and tells the transaction manager to run the selected task. Thus, control of the processor is given to the highest-priority task that is ready to be processed, and is returned to the operating system when no further work can be done by CICS or the application programs. Then, the dispatcher will again select the highest-priority task that is ready to be processed and will tell the transaction manager to run that selected task. In the example task list shown in FIG. 3, tasks Fred, Tra1 and Bill have dispatching priority values of 100, 255 and 001 respectively. Thus, if these are all tasks which are ready to run, the dispatcher will next select task Tra1 to be processed.

The log management policy 37 defines one or more log thresholds. These may for example include user-defined thresholds for available/unavailable log space, percentage of log space available/unavailable, number of successive keypoints at which trimming of the log has been inhibited, or the estimated time until the log is full at the current rate of growth, etc. The log policy manager 39 continually monitors the current usage of the transaction log and compares this usage with the log management policy to determine when a log threshold is reached. For example, the log policy manager may track the live log data volume of the active system and/or maintain a count of the number of successive keypoints which have taken place following which trimming of the log was unsuccessful.

According to the invention, the log manager responds to a log threshold being reached, by determining the active task having the oldest log record, and requesting the dispatcher to increase the dispatching priority of that particular task.

Figure 4:
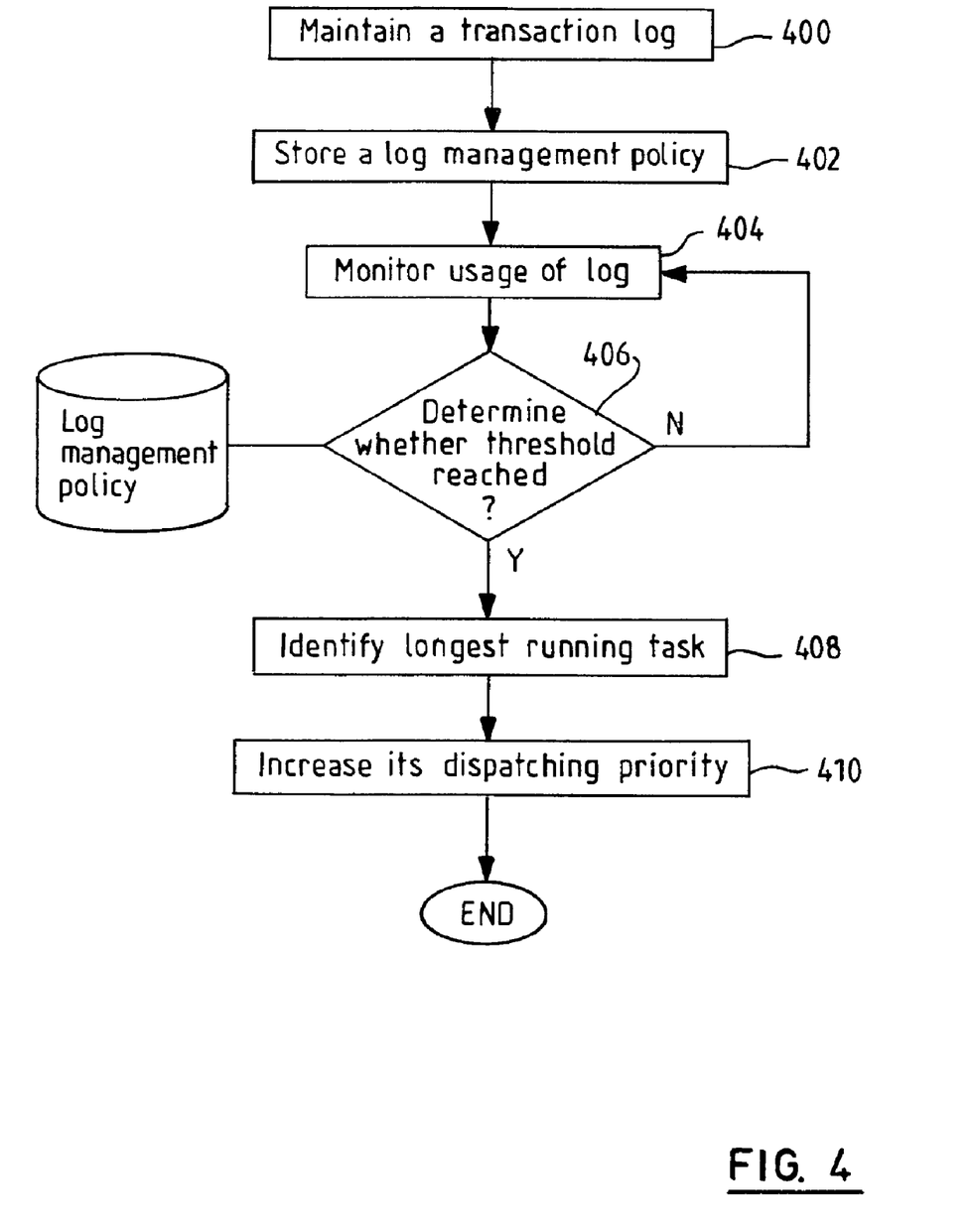
FIG. 4 shows a flowchart of a method according to an embodiment of the invention.

A method according to a preferred embodiment will now be described with reference to FIG. 4. The method comprises maintaining 400 a transaction log of recoverable changes made by transaction processing tasks and storing 402 a log management policy including at least one log threshold. Next, usage of the log by a plurality of transaction processing tasks is monitored 404 to determine when a log threshold is reached. In response to determining 406 that a log threshold has been reached, the method comprises identifying 408 an active task having the oldest log entry of all active tasks, and then increasing 410 the dispatching priority value associated with that task. This increases the likelihood that the identified, 'rogue', task will be dispatched, thereby increasing the likelihood that the 'rogue' task will reach a syncpoint and commit, which should enable the log to be trimmed at the next keypoint. Thus, dynamic alterations to the running of the UOWs within the system are made in order to decrease the likelihood of a log full condition occurring.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disc or tape, optically or magneto-optically readable memory such as compact disk (CD) or Digital Versatile Disk (DVD) etc, and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the preceding example embodiments, the invention is not limited thereto and that there are many possible variations and modifications which fall within the scope of the invention.

The scope of the present disclosure includes any novel feature or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

For the avoidance of doubt, the term "comprising", as used herein throughout the description and claims is not to be construed as meaning "consisting only of".

The invention claimed is:

1. A method for managing tasks in a transaction processing system, the method comprising:
   maintaining a transaction log of recoverable changes made by transaction processing tasks;
   storing a log management policy including at least one the log space related log threshold;
   monitoring usage of the log by a plurality of transaction processing tasks to determine when a log space related log threshold is reached; and
   in response to determining that the log space related log threshold has been reached:
      identifying an active task having the oldest log entry of all active tasks; and
      increasing a dispatching priority of the identified task.

2. A method according to claim 1, wherein a log threshold specified in the log management policy is reached when trimming of the log is inhibited at a predetermined number of successive keypoints.

3. A method according to claim 1, wherein a log threshold specified in the log management policy is reached when an estimate of the time left until the log is full is less than a predetermined period of time.

4. A method according to claim 1, wherein the log management policy defines a series of log thresholds, each having one or more actions associated therewith which may be taken when the associated log threshold is reached.

5. A method according to claim 1, in which an action associated with a log threshold comprises emitting a warning message.

6. A transaction processing system comprising: a memory including
   a transaction log containing log records identifying recoverable changes made by transaction processing tasks;
   a log management policy including at least one log space related log threshold;
   a log manager for monitoring usage of the transaction log by transaction processing tasks to determine when a log space related log threshold is reached, and for identifying an active task having the oldest log entry of all active tasks; and
   a dispatcher for selecting tasks for processing, and which is operable to increase a dispatching priority of the identified task in response to a determination that the log space related log threshold has been reached.

7. A transaction processing system according to claim 6, wherein the log management policy defines a series of log thresholds, each having one or more actions associated therewith.

8. A transaction processing system according to claim 6, further comprising means for storing a count value indicative of a number of successive keypoints at which trimming of the log has been inhibited.

9. A transaction processing system according to claim 6, further comprising means for estimating the time left before the log becomes full.

10. A transaction processing system according to claim 6, further comprising a message emitter, and in which an action associated with a log threshold comprises emitting a warning message.

11. A transaction processing system according to claim 6, further comprising a transaction manager, and in which a series of log thresholds have the following series of associated actions: the transaction manager purging the identified task, force-purging the identified task and killing the identified task.

12. A computer program product for transaction processing, the computer program product comprising a hardware computer memory having computer readable program code embodied therewith, that when loaded into a computer system and executed thereon, causes the computer to perform the steps of a method comprising:

maintaining a transaction log of recoverable changes made by transaction processing tasks;

storing a log management policy including at least one log space related log threshold;

monitoring usage of the log by a plurality of transaction processing tasks to determine when a log space related log threshold is reached;

in response to determining that the log space related log threshold has been reached:

identifying an active task having the oldest log entry of all active tasks;

increasing a dispatching priority of the identified task;

wherein a log threshold specified in the log management policy is reached when trimming of the log is inhibited at a predetermined number of successive keypoints;

wherein a log threshold specified in the log management policy is reached when an estimate of the time left until the log is full is less than a predetermined period of time;

wherein the log management policy defines a series of log thresholds, each having one or more actions associated therewith which may be taken when the associated log threshold is reached; and in which an action associated with a log threshold comprises emitting a warning message.

* * * * *